Nov. 7, 1967  R. H. CAMPBELL  3,350,747
MOLDING MACHINE AND PROCESS
Filed May 17, 1965  3 Sheets-Sheet 1
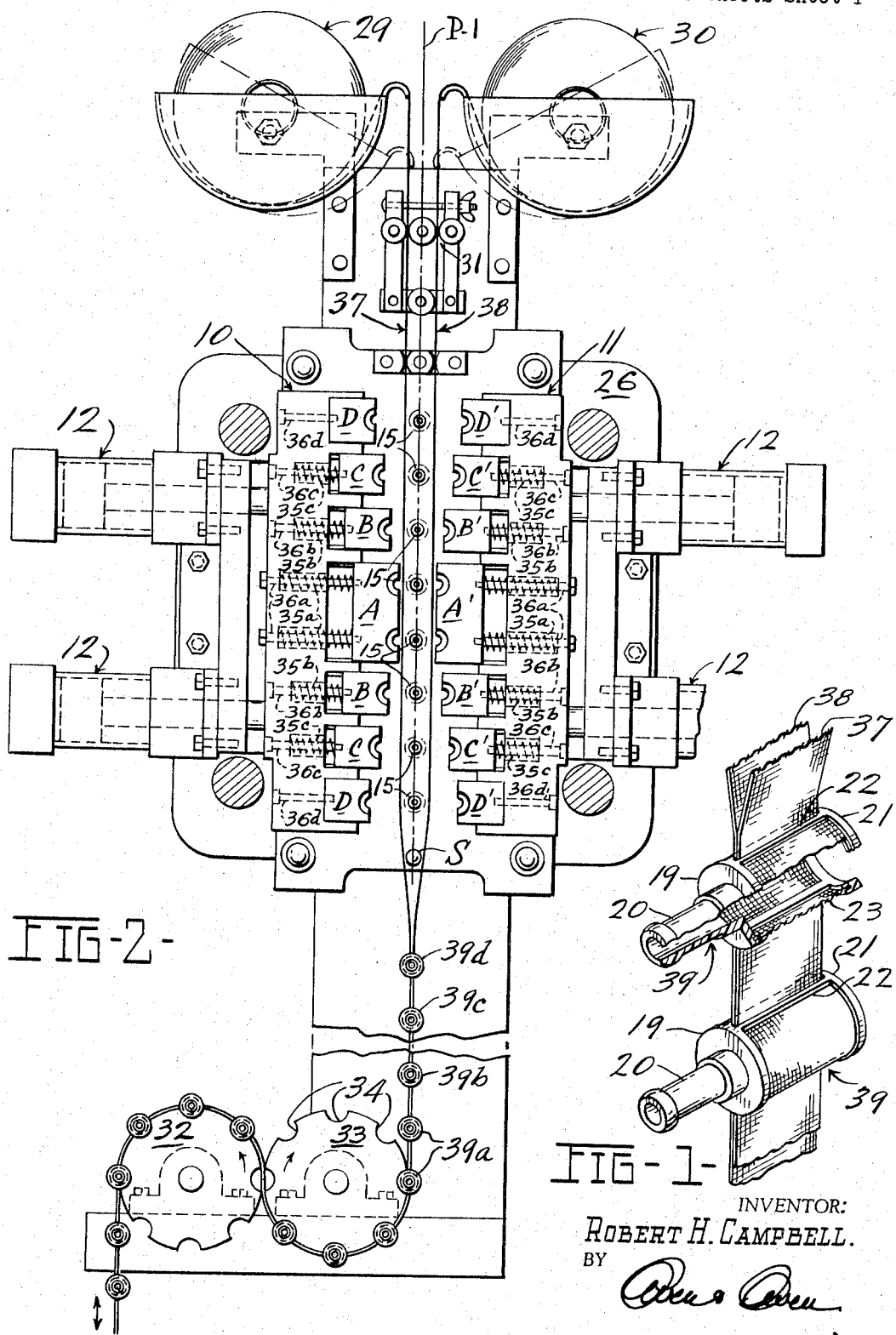
INVENTOR:
ROBERT H. CAMPBELL.
BY
ATTYS.

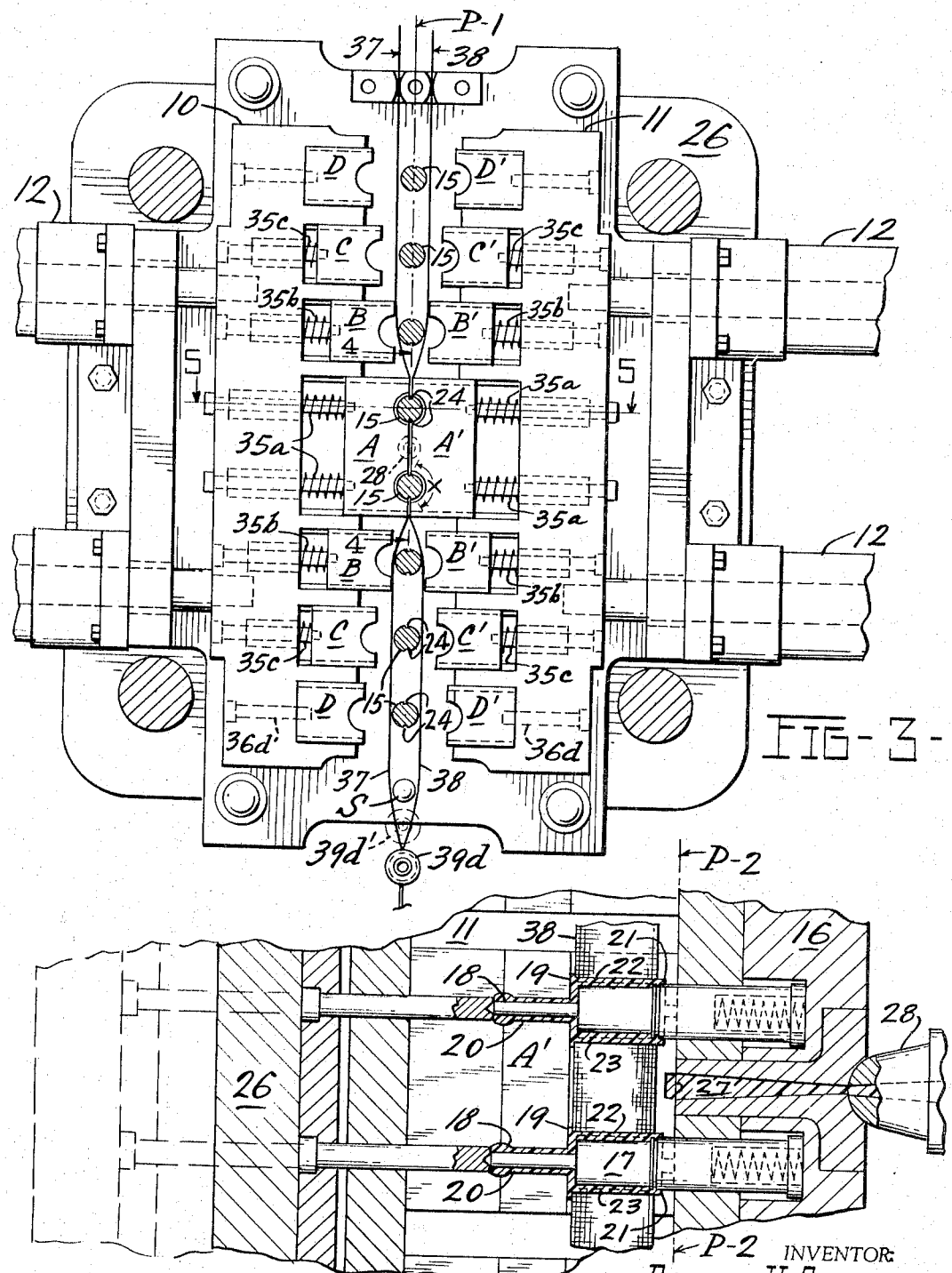

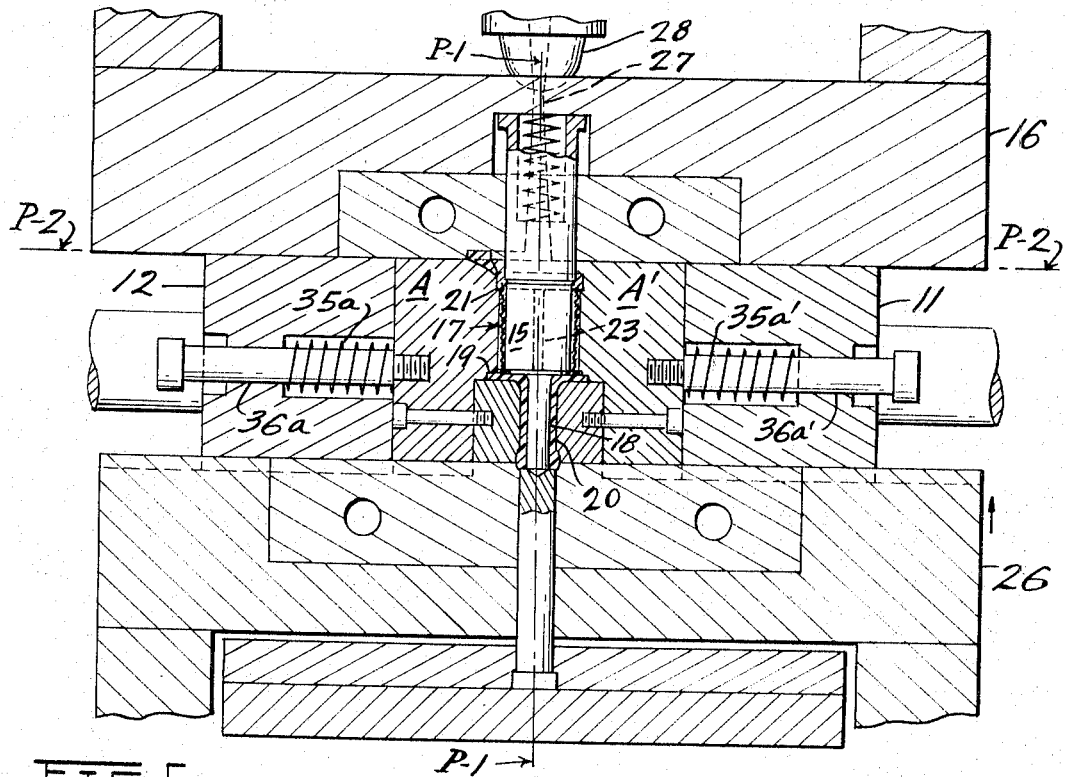
FIG-5-
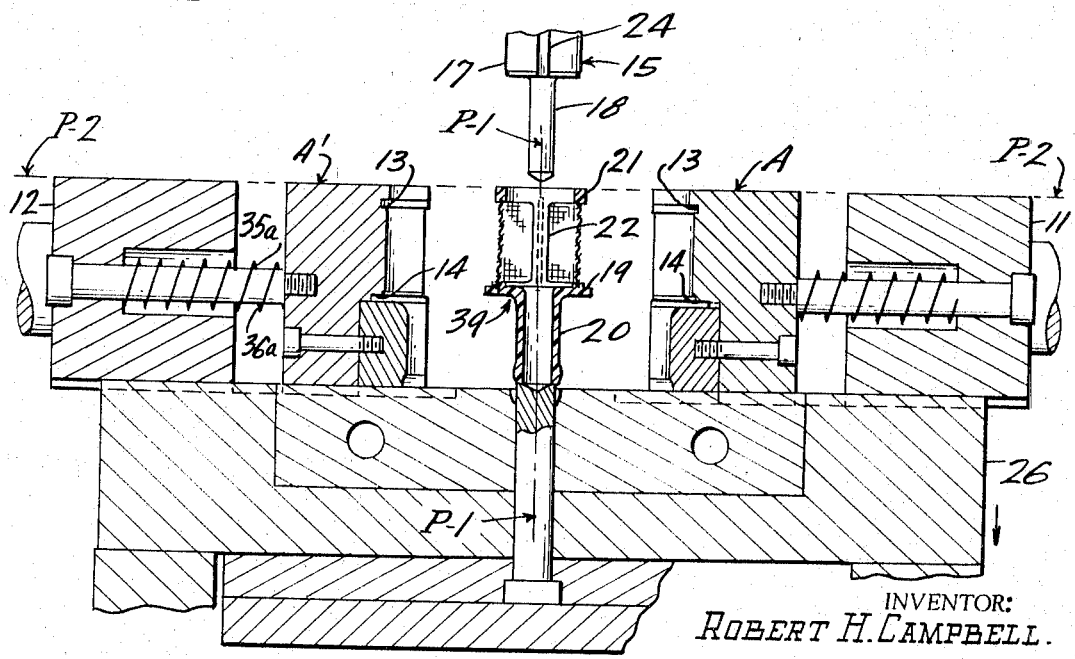
FIG-6-
INVENTOR:
ROBERT H. CAMPBELL.
BY
Owen & Owen
ATT'YS.

United States Patent Office 3,350,747
Patented Nov. 7, 1967

3,350,747
MOLDING MACHINE AND PROCESS
Robert H. Campbell, Findlay, Ohio, assignor to R. L. Kuss & Company, Inc., Findlay, Ohio, a corporation of Ohio
Filed May 17, 1965, Ser. No. 456,178
4 Claims. (Cl. 18—30)

ABSTRACT OF THE DISCLOSURE

A machine for molding a plurality of articles upon strips of material fed through the machine. A pair of opposed die platens on each side of a parting line include a row of mold halves which form mold cavities around a core member when the platens are closed. The mold halves in each platen are positioned at varying distances from the parting line such that, when the die platens close, opposed pairs of mold halves will sequentially close upon the strips of material starting at the innermost and progressing to the outermost mold halves in the row. The machine includes a mechanism for sequentially feeding lengths of the strip material between the opposed platens, for injection molding an article upon the strips within the mold, for stripping the articles from their respective mold cores after the molding step, and for removing the molded articles from between the platens as new lengths of material are fed therebetween.

---

This invention relates to an injection molding apparatus for molding of a series of thermoplastic articles upon continuous strips of material fed into the molding apparatus and the method therefor. More specifically, this invention relates to an apparatus for molding, of a thermoplastic material, liquid filter elements in which the molded inserts are formed upon continuous strips of woven material fed through the apparatus whereby the woven material is incorporated into the filter element and becomes a part thereof.

The use of fine mesh, thermoplastic woven material as the filtering element for hydrocarbon liquids has proven advantageous in many applications, such as for small in-line filters in automobiles. Such woven materials, which are commercially available in closely regulated mesh sizes, have advantages over metallic screen filter elements in that they are substantially corrosion resistant, are economical, and can be shaped into desirable configurations and thermoplastically molded into compact filter elements.

Because these woven materials are available in sheet or strip form, it is desirable, in certain filter installations, to mold them into cylindrical or other geometrically closed configurations for use in a filter casing whereby the fluid to be filtered can be directed through the shaped material. It is also desirable to provide a method of molding the strips of woven thermoplastic material into the desired shape of the filter insert with a continuous process whereby manual handling is eliminated and whereby high product uniformity is obtained to eliminate the necessity of costly inspection and other quality control measures.

Accordingly, it is an object of this invention to provide an automatic injection molding machine for producing a thermoplastic filtering element in which the filter screen is comprised of woven, thermoplastic material and in which the filter elements are molded continuously upon continuous strips of woven material fed through the injection molding machine.

It is another object of this invention to provide an injection molding apparatus capable of producing a plurality of molded filter elements upon continuous strips of thermoplastic woven material extending therethrough, in which a plurality of mold die halves can simultaneously close upon said continuous strips of woven mesh material, causing said strips of material to assume a nonlinear configuration within the dies to produce a molded, cylindrical filter element.

It is yet another object of this invention to provide a multiple-die injection molding apparatus having two rows of opposed die halves, which die halves close sequentially upon the strip of thermoplastic filtering material starting with the innermost pair of opposed, die halves in each row and progressing to the outermost pairs, whereby the continuous strips extending between the opposed rows of die halves along the parting line may be sequentially gripped by the die halves and are free to assume a non-linear configuration within said die halves as they progressively close upon said strips.

It is still a further object of this invention to provide a molding apparatus for the injection molding of filter elements upon a continuous strip of material fed therethrough, which apparatus includes a plurality of opposed, sequentially closing die halves which are positioned in opposed die sections at a variable distance from the parting line, whereby the movement of such opposed die platen toward each other will sequentially close opposed pairs of die halves, starting with the innermost and progressing to the outermost die halves, whereby said strip will be free to assume a nonlinear configuration within the die halves as they sequentially close upon said continuous strip of material.

Other objects of this invention will be apparent from the following detailed description of a preferred embodiment thereof, reference being made to the accompanying drawings, in which:

FIGURE 1 is a view in perspective of a pair of molded filter elements produced by the apparatus of this invention, each element including a hollow, cylindrical body having its outer walls formed from strips of thermoplastic, fine mesh material held in semicircular configuration by reinforced end ribs of a compatible thermoplastic material. The filter elements of FIGURE 1 are shown attached to a portion of the continuous strips of material as they are molded thereon in the apparatus of this invention.

FIGURE 2 is a view in elevation of the movable platen of the injection molding apparatus of this invention, showing the plurality of die sections slidably mounted in opposed rows in opposed die platens, and schematically indicating the position of the mold cores along the parting line between the opposed rows of die sections and also showing the manner in which continuous strips of woven material are passed along the parting line between the opposed rows of die sections and are taken up by drive sprockets below the molding apparatus;

FIGURE 3 is a view of the opposed rows of die sections similar to that of FIGURE 2, but on an enlarged scale and showing the innermost pair of die sections in closed position, after the opposed rows of die sections have been advanced toward each other by movement of the opposed die platens;

FIGURE 4 is a view in cross section taken across line 4—4 of FIGURE 3, shown on an enlarged scale, and further showing a pair of core members and the stationary platen in position when the dies are fully closed upon the strips of woven material;

FIGURE 5 is a view taken along line 5—5 of FIGURE 3, shown on an enlarged scale, showing the relationships of the closed die halves, the core member and the position of the sprue channel in relation to the molding cavity formed by the closed die sections and the core member; and FIGURE 6 is a view similar to FIGURE 5 but showing the closed die sections of FIGURE 5 in open position with the core member removed from the molded filter element.

Referring first to FIGURE 1, a pair of opposed die platens 10 and 11 are positioned on either side of a parting line P–1 and are opened and closed by hydraulically operated rams, schematically shown and indicated by reference numeral 12. A plurality of die sections or die halves A–D are slidably mounted within the die platen 10 and an equal number of opposed die sections or die halves A'–D' are mounted in a similar manner in the die platen 11. Each of the die halves A–D and A'–D', when closed with its opposite number, forms a complete, generally cylindrical die cavity having at one end a sharply reduced diameter, as best seen in FIGURES 4, 5 and 6, and having enlarged diameter grooves 13 and 14 at each end of its cylindrical body.

Referring to FIGURES 4, 5 and 6, a plurality of core members 15 are slidably mounted in a stationary platen 16 and are spaced along the parting line P–1 of the die platens 10 and 11. Each core member 15 has a generally cylindrical body 17 and an axially extending core pin 18, which, when fully inserted within a pair of closed die halves A–D and A'–D', forms a mold cavity with a configuration which will form a molded article having a flat, disc-like annular cap 19, an elongate tube 20 extending axially from the cap 19, a circular rib 21 spaced from the cap 19 and a pair of diametrically opposed, axially extending webs 22 and 23 connecting the cap 19 and the circular rib 21, as best seen in FIGURE 1. The cap 19 and circular rib 21 are formed by the grooves 14 and 13 in the die halves A–D and A'–D' while the webs 22 and 23 are formed by a pair of channels 24 and 25 in the cylindrical body 17 of the core member 15 as best seen in FIGURES 4 and 6. The diameter of the cylindrical body 17 of the core member 15 is substantially the same as the diameter of the mold cavity formed by a closed pair of die halves A–D and A'–D' so that no molding material will be injected between the surfaces of the cylindrical body 17 of the core member 15 and the large diameter of the die cavity formed by the die halves A–D and A'–D' except in the channels 24 and 25 in the core member 15 and the grooves of increased diameter 13 and 14 in the die halves A–D and A'–D'.

In the embodiment described herein, the die platens 10 and 11 are mounted for reciprocation parallel to the plane of the parting line P–1 on a movable platen 26 and the core members 15 are mounted for slight movement in the stationary platen 16 as best shown in FIGURE 5. When the die halves A–D and A'–D' are fully closed and the movable platen 26 is in closed position against the stationary platen 16 along a mold parting line P–2, the core members 15 are fully inserted to form the mold cavity for forming the filter elements shown in FIGURE 1, as best shown in FIGURE 5. Thermoplastic molding material is injected under pressure into the mold cavity through a sprue channel 27, as shown in FIGURES 4 and 5, by an injection nozzle 28.

As shown in FIGURE 2, two tape rolls 29 and 30 are positioned on fixed axes on either side of the parting line P–1 of the die platens 10 and 11 and above these platens. The tape rolls 29 and 30, which must have an accurately controlled width as will be explained below, are formed by cutting strips of the filter material from sheets of the material in order to obtain the desired strip width which is then placed in roll form for use with the injection apparatus as shown in FIGURE 2. In one embodiment, the filter cloth is composed of nylon monofilaments having a 6 mil (0.006 inch) diameter and a woven density sufficient to retain particles as small as 70 microns (about 0.0028 inch).

The free ends of the tape rolls 29 and 30, as shown in FIGURE 2, are passed downwardly between the open die platens 10 and 11 and are held on either side of the parting line P–1 by a roller guide and tensioning device 31. Below the die platens 10 and 11 are a pair of drive sprockets 32 and 33 having circumferentially spaced recesses 34 which engage each of the molded filter elements upon the tape strips as they leave the die halves A–D and A'–D'. The periphery of the drive sprocket 33 is located on the parting line P–1 so that the tape strips and molded filter elements may be initially engaged directly on the parting line P–1 and, as shown in FIGURE 2, led partly around drive sprocket 33, between the drive sprockets 32 and 33 and thence over and around drive sprocket 32. The drive sprockets 32 and 33 are connected to a suitable source of power so that they can be driven in the direction of rotation indicated by the arrows shown in FIGURE 2. A suitable disengaging mechanism is included in the power train to the drive sprockets 32 and 33 so that engagement can be quickly released and the sprockets are free to turn in the reverse direction of the arrows, as will be described below.

Each of the die halves A–C and A'–C' are slidably held within their respective die platens 10 and 11 and are urged to their outermost position toward the parting line P–1 by a spring 35 of suitable length. As seen in FIGURE 2, the die halves A and A', due to the length of their springs 35a, extend toward the parting line P–1 beyond the position of the other die halves B–D and B'–D' when the die platens 10 and 11 are fully open. The length of the springs 35b is such that die halves B and B' extend toward the parting line P–1 a distance beyond that of die halves C, D, and C' and D' but less than die halves A and A'. Similarly, the die halves C and C' are held by a spring 35c at a distance from the parting line P–1 larger than the distance from the parting line P–1 to the die halves A–B and A'–B' while the die halves D and D' are spaced furthermost from the parting line P–1 when the die platens 10 and 11 are in open position as shown in FIGURE 2. The stepwise progression of distance from the parting line P–1 to the innermost die halves A and A' to the outermost die halves D and D' is shown in FIGURES 2 and 3 in an exaggerated scale. These distances may be adjusted by an adjusting screw 36 which extends through the corresponding spring 35 and is threaded into the die halves A–C and A'–C'. As shown in FIGURE 2, the die halves D and D' have no associated springs 35 and are therefore held in fixed position relative to their corresponding die platens 10 and 11. In such an arrangement, adjustment of the relative distance of the respective die halves A–D and A'–D' from the parting line P–1 is made through adjustment of the die halves A–C and A'–C'. However, it will be apparent to persons of ordinary skill in the art that die halves D and D' can also be made adjustable and the die halves A and A' can be fixed.

As previously explained, the position of the die halves A–D and A'–D' relative to the parting line P–1 is such that the die halves A–D and A'–D', when the die platens 10 and 11 are closed upon the parting line P–1 by the hydraulic rams 12, will progressively close in an "inside-outside" sequence, i.e., the initial increment of movement of the die platens 10 and 11 toward the parting line P–1 will first close the die halves A and A'; the next increment of movement will close the die halves B and B', etc. This inside-outside sequence of die-half closure is essential for the operation of the apparatus due to the fact that, as each pair of die halves A–D and A'–D' closes around its corresponding core member 15, the parallel strips of tape material, indicated by reference numerals 37 and 38 in FIGURES 1–3, are pinched therebetween around the core members 15 and are caused to assume a semicircular configuration on each side of the cylindrical body 17 of a core member 15, as best seen in FIGURE 3. Because the distance around the outside of the core member 15, as indicated by reference numeral X on FIGURE 3, is greater than the diameter of the core member 15 along the parting line by the factor of about 3.1416/2, additional tape must be drawn into the interior of each pair of die halves A–D and A'–D' in order to assume this configuration. For this reason, the inside-outside sequence of closing the die halves A–D and A'–D' is necessary in order that additional tape can be fed to each pair of die halves A–D and A'–D' as it closes, from either the tape rolls 29 and 30 or from a reverse movement of the drive sprockets 32 and 33.

Referring specifically to FIGURES 2 and 3, the sequence of operations in closing the die platens 10 and 11 and die halves A–D and A'–D' is as follows. Upon completion of a molding cycle, with the platens 10 and 11 in open position as shown in FIGURE 2, the drive sprockets 32 and 33 are driven in the direction shown by the arrows so that the previously molded filter elements, designated by reference numeral 39, which have been formed on the tape strips 37 and 38 in the previous cycle, are pulled clear of the die halves. The topmost filter element 39d, which was molded by the uppermost die halves D and D', is spaced a sufficient distance below the lowermost pair of die halves D and D' and the tapered spike S, whose function is explained below, to allow for the amount of additional tape which will be necessary to assume the semicircular curvatures around the core members 15 when the die halves A–D and A'–D' are closed during the next cycle. After the drive sprockets 32 and 33 have been driven to pull the molded filter elements 39 to the position shown in FIGURE 2, the clutch mechanism is released so that the drive sprockets 32 and 33 are free to turn in a reverse direction. The next step in the molding cycle is to advance the movable platen 26, which carries the die platens 10 and 11 to the mold parting line P-2 against the stationary platen 16 which holds the core members 15 arranged along the parting line P-1. A tapered spike S, shown in cross section in FIGURES 2 and 3, is secured to the stationary platen 16 and will open the strips 37 and 38 apart as they are moved toward the core members 15 by the advancing movable platen 26. When the movable platen 26 has fully closed against the stationary platen 16, as shown in FIGURES 4 and 5, the die platens 10 and 11 are then moved toward the parting line P-1 by their hydraulic rams 12. As previously explained, the initial movement of the die platens 10 and 11 will cause the die halves A and A' to close upon the tape lengths 37 and 38 extending therebetween on either side of the core members 15 and will push each of the tapes into the semicircular configurations around the cylindrical body portion 17 of the core members 15. The additional length of tape necessary to assume this configuration will be drawn from the tape rolls 29 and 30 and from the drive sprockets 32 and 33 which are free to turn in a reverse direction. Thus, when the die halves A and A' are fully closed, as shown in FIGURE 3, the position of the last filter element 39d, which was formed during the previous molding cycle, has been moved upwardly to that position schematically indicated in phantom at 39d' on FIGURE 3, due to the additional tape necessary to assume the semicircular configuration within the closed die halves A and A'. The next increment of movement of the die platens 10 and 11 will close die halves B and B' which will additionally pull a small amount of tape from the tape rolls 29 and 30 and from the drive sprockets 32 and 33. In a like manner, the sequential closing of the remaining die halves C–D and C'–D' will additionally pull small amounts of tape from the tape rolls 29 and 30 and the drive sprockets 32 and 33.

The above sequence of operations allows small amounts of tape to be drawn from the tape rolls 29 and 30 or the drive sprockets 32 and 33 when a pair of matching die halves A–D and A'–D' closes in inside-outside sequence. Without such sequence, should an outer pair of die halves, such as D–D', close upon the tape lengths 37 and 38 an instant prior to an inner pair of die halves, such as C–C', the additional amount of tape necessary to assume the semicircular configuration around the core member 15 of the inner die halves C–C' would not be available and therefore the closure of the inner die halves C–C' would distort or damage the tape. Because the dimensional stability of the tape is essential for successful filtering performance, such distortion or damage would produce an unacceptable product.

When the die platens 10 and 11 reach their fully closed position, each of the die half pairs A–A' and D–D' are fully closed upon the tape strips 37 and 38 and core members 15 and the thermoplastic molding material is injected into the die cavities through the sprue channel 27 by the injection nozzle 28, as shown in FIGURES 4 and 5. As previously explained, the die cavity formed by the core member 15 and closed pair of die halves is such that a pair of molded webs 22 and 23 extends across the cylindrical body of the filter element 39 along the parting line P-1 of the die halves to mold each of the tape lengths 37 and 38 together on each side of a filter element. The edges of the tape lengths 37 and 38 are molded, in semicircular configuration, into the cap 19 and circular rib 21 so that a cylindrical filter unit is formed. In the embodiment herein described in which the woven mesh material comprising the tape lengths 37 and 38 in nylon, it is desirable to use a compatible nylon molding compound and to maintain the temperature of the die halves well below the melting point of the mesh material. Other available molding materials may be used and will be apparent to those skilled in the art.

After injection of the molding material within the die cavities and, after an appropriate hold time, the die platens 10 and 11 are opened and the movable platen 26 is moved away from the stationary platen 16 and its row of core members 15 to strip the molded filter elements 39 from the core members 15. After completion of this operation, the drive sprockets 32 and 33 are again advanced in the direction of the arrows shown in FIGURE 2 to remove the molded filter elements 39 from the molding apparatus and to draw new lengths of tape 37 and 38 from the tape rolls 29 and 30 in order to start another molding cycle. Due to the configuration of the molded filter elements 39 and elasticity of the nylon material, the core element 15 may be stripped out as soon as the opposed die halves A–D and A'–D' have released their pressure thereon but still retain their grip on the filter elements, due to the projection of the cap 19 and circular rib 21 of the filter element into the grooves 14 and 13 of the die halves. Thus, as soon as the die platens 10 and 11 have moved away from the parting line P-1 a sufficient distance to release the pressure of the innermost pair of die halves A and A' upon the molded filter elements 39 therein, the movable platen 26 can be opened away from the mold parting line P-2 and the filter elements 39 will be stripped from the core members 15, as indicated in FIGURE 6.

It will be obvious to persons skilled in the art that various methods may be used to inject the molding material within the die cavity, insert and strip the cores from the molded filter elements, and to effect the inside-outside sequential closure of the die halves A–D and A'–D'. It is to be understood that the apparatus described in a preferred embodiment selected to illustrate the principle of inside-outside sequential die closure upon a mold core and that this principle may be advantageously applied to the operation of any type of injection apparatuses wherein a plurality of individual molded parts is to be formed upon continuous strips of material passed through the apparatus.

In another embodiment using the principle of sequentially closing die halves, a double-wall or double-mesh filter element may be molded upon four strips of material which are passed through the injection molding apparatus with two strips closely adjacent one another on each side of the parting line P-1. This may be accomplished by winding double strips on the tape rolls 29 and 30 or by providing additional tape rolls for the additional strips.

Various other modifications of the above-described preferred embodiment of the invention will be apparent to

What I claim is:

1. An apparatus for molding a plurality of articles upon a pair of parallel continuous strips of material, said apparatus comprising a pair of opposed movable die platens on either side of a parting line, means for positioning said pair of strips along said parting line between said platens, a plurality of mold cores positioned at intervals along said parting line between said strips, and a plurality of matching, opposed die halves on each of said platens which, when said platens are closed, form a die around each of said mold cores and grip said strips of material therebetween, said die halves mounted in opposed rows on each of said platens at varying distances from said parting line whereby said die sections, when said platens are closed, will sequentially grip said strips of material starting at the innermost mold core and progressing outwardly toward the end die halves of each row such that said strips are free to assume a non-linear configuration on each side of said core within each pair of die halves.

2. The apparatus of claim 1 which further includes means for longitudinally feeding said pair of strips of material along said parting line between said molds, said means including a pair of feed sprockets, which when engaged, pull said strips past said die halves by a distance larger than the distance between the uppermost and lowermost die sections and means for disengaging said feed sprockets prior to the closing of said die halves whereby said strips are released and are free to assume a non-linear configuration around said cores within said die sections.

3. An molding apparatus for the simultaneous molding of a plurality of articles upon one or more continuous strips of sheet material, said apparatus including a pair of opposed, die platens mounted for movement toward and away from a parting line, a plurality of core members positioned at spaced intervals along said parting line, means for positioning and feeding one or more of said continuous strips along a path parallel to said parting line and adjacent to said core members, and a plurality of opposed die halves mounted in each of said die platens, said die halves positioned such that a complete die is formed around each of said core members when said platens are moved toward said parting line, said die halves mounted in a row in each of said platens with the distance between opposed die halves on each platen, when said platens are open, being progressively greater from the innermost opposed die halves on each platen to the outermost pairs of die halves on each platen whereby said die halves will sequentially close upon said strips and core members when said platens approach said parting line such that said strip or strips of material are free to assume the configuration between each of said core members and its corresponding die half.

4. The molding apparatus of claim 3 wherein said die halves are slidably mounted in said die platens and are spring biased toward said parting line such that, when said platens are opened and their bias springs extended, the distance between opposed die halves on each platen is progressively greater from the innermost opposed pair to the outermost opposed pair.

References Cited

UNITED STATES PATENTS

| | | |
|---|---|---|
| 1,794,435 | 3/1931 | Barth. |
| 2,288,899 | 7/1942 | Gits _____ 18—30 X |
| 2,516,789 | 7/1950 | Montoriol et al. _____ 18—30 |
| 2,811,744 | 11/1957 | Baldanza _____ 18—30 X |
| 3,954,068 | 9/1960 | Williamson. |

FOREIGN PATENTS

| | | |
|---|---|---|
| 1,272,998 | 8/1961 | France _____ 18—19 |

WILLIAM J. STEPHENSON, *Primary Examiner.*